INTEGRAL PULSE SWITCHING SYSTEM

Filed Sept. 25, 1964

INVENTOR.
GEORGE D. HANCHETT
BY
Edward J. Norton
Attorney

United States Patent Office 3,334,244
Patented Aug. 1, 1967

3,334,244
INTEGRAL PULSE SWITCHING SYSTEM
George D. Hanchett, Summit, N.J., assignor to Radio Corporation of America, a corporation of Delaware
Filed Sept. 25, 1964, Ser. No. 399,280
7 Claims. (Cl. 307—88.5)

This invention relates to a voltage responsive switching system capable of transmitting a voltage pulse applied thereto to a load at a low voltage value of the pulse. Although the switching system of this invention has other utility, it is here described, by way of example, as part of a thermostatically controlled system for turning on and off a current through a heating device in response to variations in temperature.

In many prior art pulse switching systems, the voltage of the pulse to be switched must rise to a substantial value before the switching means can be turned on. As a result, the early or low voltage part of the pulse is not used. Furthermore, as a result of switching a current at high voltage, transients are caused which may have annoying effects, such as the production of interference in nearby radio and television receivers.

It is an object of this invention to provide a switching system which may be switched on at a low voltage level of a pulse applied thereto in response to a controlling condition.

It is an additional object of this invention to provide a switching system which may be switched on in a manner so as to utilize substantially the complete time duration of a supply pulse.

Another of the objects of this invention is to provide a means for applying a supply pulse to a load in such a manner as to avoid transients.

It is a further object of this invention to provide a thermostatically controlled electric heating device which does not cause noticeable radio or television interference, if any.

In accordance with this invention, current pulses are passed through a load, which may be a heating element, by way of an electronic switch means. Means are provided to turn the electronic switch means on or off in response to changes of a controlling condition, such as variations of the resistance of a temperature responsive variable resistor, to vary the current through the load. The switch means is turned on at a low voltage level (about six volts) of the supplied current pulses whereby the current starts to flow at a low voltage level of the pulse and the current continues to flow throughout the remainder of the voltage pulse. Since the turning on of the heating current takes place at a very low voltage level of the current pulse, and since the current is not turned off during the current pulse, transients and, therefore, radio or television interference are minimized.

Figure 1:
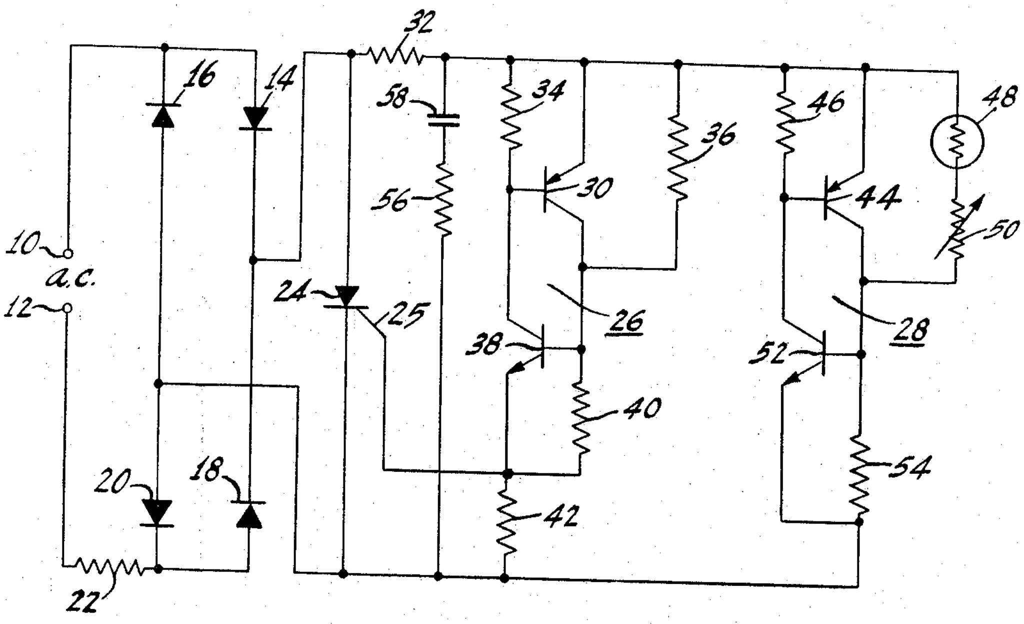
Figure 2:
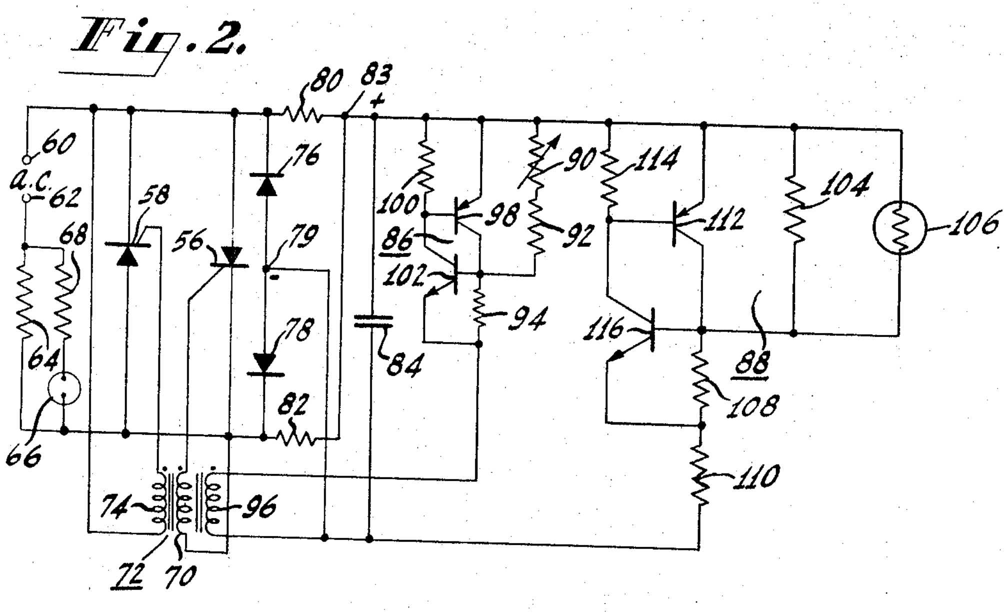

The novel features of the invention, both as to its organization and method of operation, as well as additional objects and advantages thereof, will be understood more readily from the following description thereof when read in conjunction with the accompany drawing, in which:

FIG. 1 is a circuit diagram of a thermostatically controlled apparatus including one form of the present invention, and FIG. 2 is a circuit diagram of apparatus including another embodiment of this invention.

Referring to FIG. 1, there is shown a circuit having a pair of input terminals 10 and 12 across which an alternating current power supply may be connected. One of these terminals 10 is connected to the anode of a first rectifier diode 14 and the cathode of a second rectifier diode 16. The other of these terminals 12 is connected through a load resistor 22 to the anode of a third rectifier diode 18 and also through the load resistor to the cathode of a fourth rectifier diode 20. The load resistor 22 may be a heating element of a utilization device. The anode and cathode of a solid state valve 24, which may be a silicon controlled rectifier, is connected between the junction of the cathodes of the first and third diodes 14 and 18 and the junction of the anodes of the second and fourth diodes 16 and 20. The silicon controlled rectifier 24 is poled with its cathode connected to the anodes of the second and fourth diodes 16 and 20. In the circuit so far described, the full wave bridge rectifier comprising the four diodes 14 to 20 and their connections applies two positive half wave pulses or pulse cycles of voltage to the anode of the silicon controlled rectifier 24 with respect to the cathode thereof in response to each cycle of A.C. applied across terminals 10 and 12. Since only unidirectional pulses are applied to the reverse blocking type of thyristor or silicon controlled rectifier 24 in the circuit of FIG. 1, the rectifier 24 is used primarily as a switching means and not for current rectification. The silicon controlled rectifier 24 remains non-conductive until a sufficiently high positive potential is applied to the gate or control electrode 25 thereof with respect to its cathode, at which time the rectifier 24 becomes conductive even though the voltage of the supplied half wave pulse is very low (for example, about six volts). The controlled rectifier 24 remains conductive, regardless of the potential applied to its control electrode 25, until the voltage applied between its cathode and anode approaches zero, at which time the controlled rectifier 24 becomes non-conductive. The controlled rectifier 24 may again be rendered conductive upon applying a sufficiently high positive potential to its control electrode 25 with respect to its cathode. In the embodiment of the invention shown in FIG. 1, control means are provided to cause the rectifier 24 to become conductive or non-conductive in response to a change in temperature. The switching, however, always takes place at a low voltage level of the input pulse. Therefore, transients and consequent radio and television interference are minimized, and substantially the whole cycle of a voltage pulse is utilized.

The control means for the controlled rectifier comprises two parallelly connected paths 26 and 28. The first path 26 comprises a PNP transistor 30 whose emitter is connected to the anode of the silicon controlled rectifier 24 through a current limiting resistor 32. The emitter of the transistor 30 is also connected to its base through a resistor 34 and to its collector through a resistor 36. The base of the PNP transistor 30 is connected to the collector of an NPN transistor 38. The collector of the transistor 30 is connected to the base of the transistor 38. A resistor 40 is connected between the base and the emitter of the transistor 38. The emitter of transistor 38 is connected to the control electrode 25 of the silicon controlled rectifier, and the emitter of transistor 38 is also connected to the cathode of the silicon controlled rectifier 24 through a resistor 42.

The second path 28 comprises a second PNP transistor 44 whose base is connected to its emitter through a resistor 46. The emitter of the transistor 44 is connected to the emitter of the transistor 30. A temperature responsive circuit comprising a temperature responsive resistor 48 and a variable resistor 50 in series therewith is connected between the emitter and the collector of the transistor 44. The base of the transistor 44 is connected to the collector of a second NPN transistor 52, and the collector of the transistor 44 is connected to the base of the transistor 52. A resistor 54 is connected between the base and the emitter of the transistor 52. The emitter of the transistor 52 is connected to the cathode of the silicon controlled rectifier 24. If desired, a third path comprising a resistor 56 and a capacitor 58 in series may be connected across the paths 26 and 28 for a purpose shortly to be explained.

Each of the paths 26 and 28 is a voltage level path which may become conductive at a low voltage thereacross. However, the voltage at which the paths 26 and 28 become conductive is determined by the values of resistors 36, 40 and 42 for path 26 and of resistors 48, 50 and 54 for path 28, as will be explained.

In the operation of the described circuit, voltage pulses or pulse cycles appearing at the output of the full wave rectifier 14–20 in response to the alternating current applied across the input terminals 10 and 12 build up on the anode of the controlled rectifier 24 with respect to its cathode. Until a positive starting potential of sufficient amplitude is applied to the control electrode 25 of the controlled rectifier 24 with respect to the cathode thereof, no current flows through the rectifier 24 in series with the load resistor 22. These positive pulses or pulse cycles are also applied across the path comprising the resistor 56 and the condensor 58 and across both paths 26 and 28.

Upon application of a voltage pulse across the silicon controlled rectifier 24, a small current flow through the resistors 36, 40 and 42 of the first path 26 and through the temperature responsive resistor 48 and the resistors 50 and 54 of the path 28. These currents also flow through the load resistor 22 and through the current limiting resistor 32, but these currents are too small to cause substantial heating of the load resistor 22 or to cause a substantial voltage drop in the current limiting resistor 32.

Let is be assumed that the variable resistor 50 is so adjusted that the sum of the resistances of the temperature responsive resistor 48, the variable resistor 50 and the biasing resistor 54 is greater than the sum of the resistances of the resistors 36, 40 and 42. Then, more current flows in the resistors 36, 40 and 42 of the first path 26 than in the resistors 48, 50 and 54 of the second path 28. A voltage drop builds up across the resistor 40 which is negative on the emitter of the NPN transistor 38 with respect to the base thereof, the emitter of this transistor 38 being negative with respective to its collector. The transistor 38 becomes conductive whereby negative voltage is applied to the base of transistor 30 with respect to its emitter due to current flow through the resistors 34 and 42 and the transistor 38. Transistor 30 also becomes conductive and the resistance of the path 26 is greatly reduced, whereby an increased current flows through the emitter-to-collector path of the PNP transistor 30 and the NPN transistor 38 and through the resistor 42. The increased voltage drop across the resistor 42 is applied to the control electrode 25 of the silicon controlled rectifier 24 to make it conductive. While the voltage of the pulse builds up across the path 26 (before the path 26 becomes conductive), the capacitor 58 charges to store sufficient energy therein reliably to turn on the controlled rectifier 24. When the path 26 becomes conductive, the energy stored in capacitor 58 flows through the transistors 30 and 38, into the control electrode 25 of the controlled rectifier 24, out of the cathode thereof, and back to the capacitor 58 through the current limiting resistor 56 reliably to turn on the rectifier 24. When the silicon controlled rectifier 24 becomes conductive, current flows through the silicon controlled rectifier 24 and through the load circuit 22 causing it to heat. As soon as the rectifier 24 becomes conductive, the voltage thereacross becomes very low, so that the second path 28 cannot become conductive. The first path 26 becomes conductive at a low level of voltage of the input pulse, whereby the controlled rectifier 24 is turned on at so low a voltage thereacross that substantially the whole cycle of the applied pulse is used for heating the load resistor 22, and substantially no transients appear, whereby substantially no radio or television interference is caused by this switching action. Current flows through the controlled rectifier 24 and through the load 22 in series until the voltage of the pulse drops to or near zero.

At the beginning of a pulse cycle neither one of the paths 26 and 28 is conductive. As the temperature responsive resistor 48 becomes hotter (for example, in response to heat developed by the load 22), its resistance becomes less. When the series resistance of the three resistors 48, 50 and 54 becomes less than the series resistance of the three resistors 36, 40 and 42, the path 28 becomes conductive in a manner similar to that explained in connection with path 26. When the path 28 becomes conductive, due to the increased voltage drop in the current limiting resistor 32, the voltage across the path 26 drops to the point where the path 26 cannot become conductive. Therefore, the silicon controlled rectifier 24 does not become conductive until the temperature to which the resistor 48 is exposed is lower than that for which the thermostatic apparatus described is set.

Another embodiment of this invention is shown in FIG. 2. In this embodiment, the anode of one silicon controlled rectifier 56 and the cathode of a second controlled rectifier 58 are connected to a terminal 60 of a source of alternating current (not shown) while the cathode of the rectifier 56 and the anode of the rectifier 58 are connected to the other terminal 62 of the source through a load 64, which may be a heating resistor. If desired, a neon tube indicator 66 and a current limiting resistor 68 in series therewith may be connected across the load 64 to indicate when a heating current flows therethrough. The control electrode or gate of the controlled rectifier 56 is connected through a first secondary winding 70 of a pulse transformer 72 to the cathode of the silicon controlled rectifier 56, while the control electrode or gate of the silicon controlled rectifier 58 is connected through a second secondary winding 74 of the pulse transformer 72 to the cathode of the silicon controlled rectifier 58. A pair of rectifier diodes 76 and 78 are connected across the terminals 60 and 62 through the load 64, the anodes of the diodes 76 and 78 being connected together at a junction 79, and the cathode of the diodes 76 and 78 being connected together through two series connected current limiting resistors 80 and 82. Therefore, two voltage pulses or pulse cycles appear between the junction 83 of the two resistors 80 and 82 and the junction 79 for each cycle or pair of pulses of A.C. applied across the terminals 60 and 62, the junction 83 being positive with respect to the junction 79. A storage capacitor 84 is connected between the junctions 79 and 83 for a purpose to be disclosed.

A pair of voltage level switch paths 86 and 88 are connected in parallel with the storage capacitor 84. These paths 86 and 88 resemble, both in circuit connection and in operation, the paths 26 and 28 of FIG. 1. One of these paths 86 comprises a variable resistor 90 and two additional resistors 92 and 94 and the primary winding 96 of the impulse transformer 72 in tandem. This path also includes a PNP transistor 98 whose emitter-to-collector path is connected across the series resistors 90 and 92, the emitter of the transistor 98 being connected to the junction 83. A further resistor 100 is connected between the junction 83 and the base of the transistor 98. The base of this transistor 98 is also connected to the collector of an NPN transistor 102 whose base-to-emitter path is connected across the resistor 94.

The path 88 comprises a fixed resistor 104 and a temperature responsive resistor 106 in parallel connected in tandem with two fixed resistors 108 and 110 in the order named from the junction 83 to the junction 79. This path 88 also includes a second PNP transistor 112 whose emitter is connected to the junction 83 and whose collector is connected to a point between the resistors 104 and 108. The base of this transistor 112 is connected through a resistor 114 to the junction 83 and is directly connected to the collector of a second NPN transistor 116. The base-to-emitter path of this transistor 116 is connected across the resistor 108.

In the operation of the circuit of FIG. 2, the rectified voltage pulses apearing between the junctions 83 and 79 are applied across the capacitor 84 and the two paths 86 and 88 in parallel. The current flowing in the tandem resistors 90, 92 and 94 of the path 86 and in the combination of resistors 104, 106, 108 and 110 of the path 88 also flows through the load resistor 64 and one of current limiting resistors 80 and 82. However, this current may be so small that it causes no substantial heating of the load resistor 64, no indication by the indicator 66, and no substantial voltage drop in either resistor 80 or 82. At least, the current in load resistor 64 is insufficient to raise the ambient at temperature responsive resistor 106 beyond a certain critical value.

These paths 86 and 88 break down, that is, become conductive, at a low value of voltage applied thereacross, depending on the sizes of the resistors therein, as explained in connection with the operation of paths 26 and 28 of FIG. 1. Let it be assumed that, at a particular adjustment of the resistor 90 and at a particular temperature of the resistor 106, as the voltage of the applied pulse appearing between the junctions 83 and 79 rises, the first path 86 breaks down first. At this time, the voltage drop across the two transistors 98 and 102 in series is very low and the pulse applied across the path 86, as well as the charge stored in the capacitor 84, goes through the primary winding 96 of the pulse transformer 72, thereby causing pulses to be applied between the control electrodes of the controlled rectifiers 56 and 58 and their respective cathodes that are sufficiently great reliably to cause them both to become conductive. The charge stored on the capacitor 84 is sufficient to ensure reliable conduction of the two controlled rectifiers 56 and 58. However, at the instant that the path 86 becomes conductive, the voltage across the anode and cathode of one of the controlled rectifiers 56 and 58 is negative on the anode thereof, whereby this rectifier cannot conduct current. The voltage across the other of the control rectifiers, at that instant, is positive on its anode. The latter rectifier begins to conduct at a very low voltage of the wave applied thereacross (about six volts, and continues to conduct until the wave applied thereacross reduces to near zero, at which time the conducting rectifier again becomes non-conducting. Therefore, nearly a complete pulse cycle of current flows through the load resistor 64 during the conductivity of the conductive one of the two rectifiers 56 or 58. This voltage builds up across the indicator 66 and causes it to light up to indicate a substantial flow of current through the load 64. At the occurrence of the next succeeding half cycle of the applied A.C. wave, if the path 86 again breaks down first, the other of the controlled rectifiers conducts for nearly a pulse cycle, the first rectifier being poled so that it is not conductive for the other half cycle of A.C. wave applied thereto. Whichever controlled rectifier becomes conductive so reduces the voltage drop across the two paths 86 and 88 that the non-conductive path 88 cannot become conductive for the remainder of the half cycle of A.C. supply voltage.

Let it be assumed that the adjustment of the resistor 90 and the temperature of the temperature responsive resistor 106 are such that the path 88 becomes conductive before the path 86 as the voltage of the applied pulse increases. Current flowing through one of the current limiting resistors 80 or 82 (depending on which of the diodes 78 or 76 is conductive) increases to the point where the voltage available between the terminals 83 and 79 is too small to make the path 86 conductive during the remainder of the same pulse. No voltage is then applied to the primary winding 96 of the pulse transformer 72 and neither one of the control rectifiers 56 and 58 are rendered conductive during any pulse cycle during which the path 88 becomes conductive rather than the path 86.

Although only two forms of integral or substantially complete cycle switching circuits have been described, it will undoubtedly be apparent to those skilled in the art that variations are possible within the spirit of the present invention. Hence, it should be understood that the foregoing description is to be considered as illustrative and not in a limiting sense.

What is claimed is:

1. A synchronously switched electronic thermostatic system comprising:

(a) a semi-conductor gate device having first and second main electrodes and a control electrode, said device becoming conductive when a voltage above a first threshold value is applied across said main electrodes and when a pulse of sufficient magnitude is applied to said control electrode, said device when once conducting remaining conductive until the voltage across said main electrodes reduces to a value below a second threshold value;

(b) first circuit means connected in parallel across said main electrodes, and being further connected to said control electrode;

(c) second circuit means connected in parallel across said main electrodes, said second circuit means including a sensing element responsive to the ambient of the area to be temperature controlled, the condition of said sensing element rendering one of said circuit means conductive to the exclusion of the other;

(d) means for supplying a varying voltage signal across said main electrodes; and (e) means for applying a pulse derived from said signal to said control electrode via said first circuit means when said first circuit means has been rendered conductive to the exclusion of said second circuit means, said pulse causing said gate device to become conductive when there is supplied across said main electrodes a voltage above said first threshold value.

2. A synchronously switched electronic thermostatic system as described in claim 1 wherein said pulse applying means comprises an RC time constant circuit.

3. A synchronously switched electronic thermostatic system as described in claim 1 wherein said sensing element comprises a device having a high negative temperature coefficient of resistance.

4. A synchronously switched electronic thermostatic system as described in claim 1 wherein:

(a) said first circuit means comprises first and second transistor elements; and (b) said second circuit means comprises third and fourth transistor elements.

5. A synchronously switched electronic thermostatic system comprising:

(a) a semi-conductor gate device having first and second terminal electrodes and a control electrode;

(b) first circuit means comprising a first PNP transistor element having base, collector and emitter electrodes and a first NPN transistor element having base, collector and emitter electrodes, the base of said PNP element being directly connected to the collector of said NPN element, the base of said NPN element being directly connected to the collector of said PNP element, a first resistor connected across the base and emitter of said PNP element a second resistor connected across the collector and emitter of said PNP element, a third resistor connected across the base and emitter of said NPN element, a fourth resistor connecting the emitter of said PNP element to the first terminal electrode of said gate device and a fifth resistor connecting the emitter of said NPN element to the second terminal electrode of said gate device, the emitter of said NPN element being further connected to said control electrode of said gate device;

(c) second circuit means comprising a second PNP transistor element having base, collector and emitter electrodes and a second NPN transistor element having base, collector and emitter electrodes, the base of said second PNP element being directly connected to the collector of said second NPN element, the base of said second NPN element being directly connected to the collector of said second PNP element, a sixth resistor connected across the base and emitter of said second PNP element, a seventh resistor connected across the base and emitter of said second NPN element, a temperature sensitive resistance element and a variable resistance element in series connected across the emitter and collector of said second PNP element, the emitter of said second PNP element being connected to the emitter of said first NPN element and the emitter of said second NPN element being connected to said second terminal electrode of said gate device;

(d) and means by which a varying voltage signal source is connected across said terminal electrodes of said gate device.

6. A synchronously switched electronic thermostatic system as described in claim 5 further comprising an RC time constant circuit connected at one end to the emitter of said first PNP element, and at the other end thereof to said second terminal electrode of said gate device.

7. A synchronously switched electronic thermostatic system as described in claim 5 further comprising means for connecting said gate device through a load across a source of current pulses.

References Cited

UNITED STATES PATENTS

| | | | |
|---|---|---|---|
| 3,111,008 | 11/1963 | Nelson | 307—88.5 X |
| 3,136,877 | 6/1964 | Heller | 307—88.5 X |
| 3,161,759 | 12/1964 | Gambill et al. | 307—88.5 X |
| 3,175,077 | 3/1965 | Fox et al. | 307—88.5 X |

ARTHUR GAUSS, *Primary Examiner.*

D. D. FORRER, *Assistant Examiner.*